Nov. 21, 1961   G. K. GANTSCHNIGG ET AL   3,009,730
EJECTOR FOR EXTERNAL CARRIED STORES
Filed Aug. 13, 1958
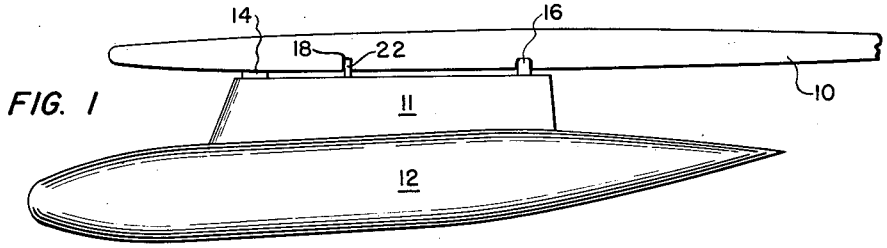
FIG. 1
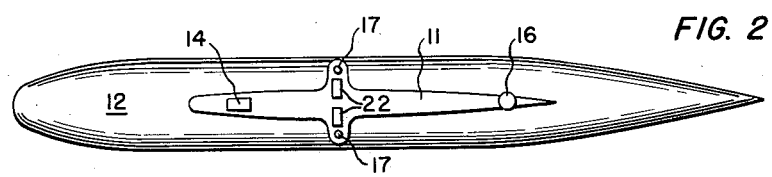
FIG. 2
FIG. 3        FIG. 4        FIG. 5
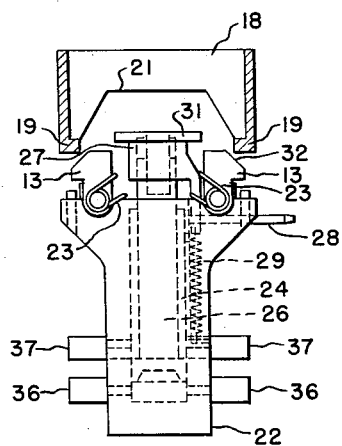 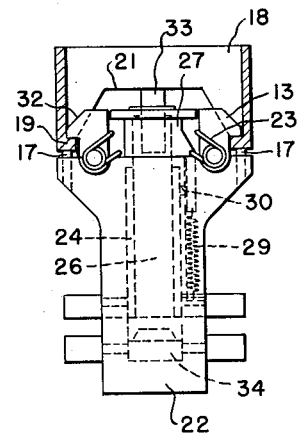 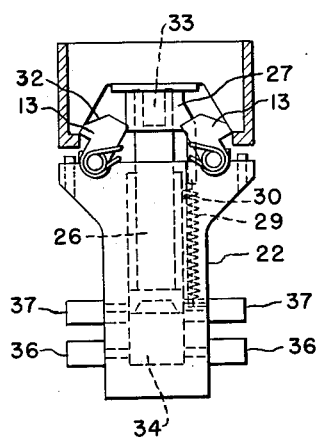
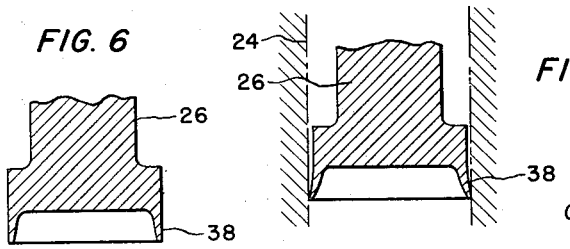
FIG. 6    FIG. 7
INVENTORS
GOTTFRIED K. GANTSCHNIGG
RICHARD W. ZIEGLER, JR.
BY
ATTORNEY

United States Patent Office 3,009,730
Patented Nov. 21, 1961

3,009,730
EJECTOR FOR EXTERNAL CARRIED STORES
Gottfried K. Gantschnigg and Richard W. Ziegler, Jr., San Diego, Calif., assignors to General Dynamics Corporation, San Diego, Calif., a corporation of Delaware
Filed Aug. 13, 1958, Ser. No. 754,864
7 Claims. (Cl. 294—83)

This invention relates to ejecting mechanisms and more particularly to an explosion type ejecting mechanism wherein the ejecting mechanism itself is separated from the object to which it had been attached.

In high speed aircraft it is desirable to provide for a forced separation of externally carried objects such as fuel tanks, bombs or other expendable items. With the conventional type of suspension, forward and aft hooks and chockbolts and at least one ejection gun are assembled in one unit called the ejector, which is installed in the fuselage or wing of the aircraft. With this arrangement the aircraft has to carry the full weight of the ejector on its further mission after the object carried has been released.

The present invention comprises a disposable ejector mechanism that releases itself from the aircraft along with the object which it carries. Since it performs only once it is of a simple and inexpensive design, yet is very effective and reliable in operation. The mechanism includes an ejector gun over the center of gravity of the object carried and which will release a pair of hooks releaseably engaging flanges of a backup fitting on the aircraft. A pair of adjustable chockbolts, one on either side of the hooks, support the object carried against the sideloads that are exerted against it. A second pair of adjustable chockbolts fore and aft support the object carried against pitching forces. The ejector gun electrically fires an explosive cartridge which forces a piston upward to release the hooks. Further upward movement exposes a second explosive cartridge which becomes ignited, driving the piston against the backup fitting and ejecting the gun mechanism and object from the aircraft. Since the gun fires only once, expensive precise machining of the piston and gun cylinder is not necessary and is avoided by use of a thin rim around the inner end of the piston. Gas pressure from the exploding cartridge presses this rim against the cylinder wall, creating a tight seal between tthe piston and cylinder to prevent escapement of the gases.

It is therefore an object of this invention to provide for a novel and improved ejection mechanism.

Another object is the provision of an improved ejection mechanism for releasing an object from an aircraft wherein the ejection mechanism is also released from the aircraft.

Another object is the provision of a sequence firing mechanism for obtaining a longer lasting, more uniform and smoother firing pressure.

Another object is the provision of a cartridge firing ejection system wherein close tolerance between the piston and cylinder is accomplished by deflection of a thin rim on the inner end of the piston by the explosive gases.

Another object is the provision of an electrically fired ejector mechanism having a manual release means for disassembly without activation.

Another object is the provision of a means for easily mounting an externally carried object to an aircraft with a minimum of effort.

Other objects and features of the present invention will be readily apparent to those skilled in the art from the following specification and appended drawings wherein is illustrated a preferred form of the invention, and in which:

FIGURE 1 is an elevational view of a tank and pylon attached to the wing of an aircraft, FIGURE 2 is a plan view of the tank and pylon ready for attachment, FIGURE 3 shows the use of the manual release pin in mounting the ejector mechanism into position, FIGURE 4 shows the ejector in locked position, FIGURE 5 shows the ejector mechanism being actuated, FIGURE 6 shows a cross-sectional view of the end of the piston, and FIGURE 7 shows how the thin rim is pressed against the cylinder wall to form an effective seal.

Referring now to FIGURE 1 there is shown an aircraft wing 10 having a pylon 11 and fuel tank 12 attached underneath. The pylon is suspended at its center of gravity when the tank is empty by a pair of hooks 13 attached to a fitting on the wing.

As better shown in FIGURE 2 a forward pad 14 and an aft chock 16 are used to prevent relative pitch movement between the pylon and wing. The aft chock 16 is supported in a socket type fitting in the wing and is adjusted, after the attachment of hooks 13 to the fitting, to absorb the forward loads and dragload. Side chockbolts 17 are adjusted to resist sideloads on the tank. Hooks 13 are a part of the ejection mechanism and are shown more in detail in FIGURE 3. Here a backup fitting 18 is adapted for fixed mounting within the understructure of the wing 10 as shown in FIGURE 1 which will carry the tank by receiving support housing 22. This fitting has spaced inwardly directed flanges 19 between which the outwardly directed hooks 13 of the ejector mechanism are projected for engagement therewith. An abutting surface 21 is also provided to limit upward movement of the piston. The hooks 13 are pivotally mounted on top of housing 22 and normally are urged outwardly by springs 23. Within the housing is the piston cylinder 24 in which is inserted piston 26. Slidably mounted over the end of piston 26 is a lifterblock 27 which is driven upwardly into contact with the abutting surface 21 by the piston 26. Additionally, a pin 28 may be used to urge the lifterblock 27 upwardly without actuation of the piston for the purpose of connecting the tank or removing it while on the ground. Spring 29 normally keeps the lifterblock 27 in its downwardmost position where collar 31 acting as a lock means fits between the hooks 13 in locking relationship to prevent their inward pivotal movement and disengagement from flanges 19.

After release pin 28 is urged upwardly to free collar 31 from contact with hooks 13, the housing 22 may be moved upwardly. The inclined surfaces 32 on the hooks abut the flanges 19 and cause the hooks to cam inwardly until the hooks have been fully inserted. Then pin 28 is removed, permitting spring 29 to pull the lifterblock 27 back down to its locking position so that its collar 31 rests between the hooks 13 to prevent their inward releasing movement. This position is shown in FIGURE 4. Here a rubber bumper 33 is shown contacting the abutting surface 21 of the backup fitting 18. This bumper is frictionally mounted in an opening in the top of piston 26. It should be noted here that this bumper is not connected to the lifterblock 27 which may be moved upwardly relative to the piston 26 by means of the release pin 28. Chockbolts 17 and chock 16 are adjusted to prevent play between the pylon 11 and wing 10.

FIGURE 5 shows the ejection mechanism in operation after it has been fired. A first or starter set of cartridges 36 communicates with the firing chamber 34 and may be electrically fired by the operator. As the piston 36 moves upwardly the orifices to a second or sequence set of cartridges 37 are exposed. The pressure from the firing of the starter cartridges will cause the sequence cartridges to ignite, causing an increase of pressure on the further stroke of the piston. This provides for a smoother, longer lasting and more uniform ejecting pressure than the conventional high initial pressure which has a fast dissipation rate. On firing, the upper part of the piston 26 pushes against a shoulder on the lifterblock 27, moving its collar 31 from between and out of contact with the hooks 13. The preload of the rubber bumper 33, gravitational force of the tank and the force causing relaive movement between the piston 26 and housing 22 exerts a greater downward force than the lateral frictional force between flanges 19 and hooks 13, thereby opening the hooks 13 completely and freeing housing 22 for ejection. Upward movement of the piston 26 causes bumper 33 to compress, acting as a shock absorber to cushion the upward movement of the piston. This also preloads the bumper which assists in driving the piston back downwardly after the ejection stroke has been obtained. On completion of the piston stroke the explosive gases are released from the cylinder through opening 30 at the top of the cylinder, used by pin 28 in retaining the lifter block 31 in its upward position in mounting the ejector mechanism. This lessens the pressure behind the piston and permits it to be retained within the housing after firing.

FIGURES 6 and 7 show the preferred type of piston 26 which avoids the necessity of expensive machining of the piston to a close tolerance with the cylinder walls, or providing spring loaded piston rings or rubber O-rings. The bottom portion of the piston is dished out, leaving a thin rim 38 around the outer edge. In FIGURE 7 this rim 38 is shown pressed outwardly against the cylinder wall 24. This outward depression is caused in the early stage of the piston movement when the starter cartridge 36 is fired, and effectively forms a seal to prevent further escapement of the explosive gases.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. An ejecting mechanism for releasing an externally carried object attached to an aircraft comprising a back-up fitting on the aircraft having a pair of laterally inwardly extended flanges, an ejection housing to which said object is affixed, said housing having a pair of hooks mounted thereon for pivoting about fixed axes into and out of engagement with said flanges, the said axis of pivot of each of said hooks being laterally displaced inwardly from the hook flange engaging portion, resilient means urging said hooks into engagement with said flanges, lock means for retaining said hooks in engagement with said flanges and to prevent their disengagement therewith, and release means for disengaging said hooks from said flanges by driving said housing away from said back-up fitting imparting uncoupling force moments to the flange engaging portions of said hooks rotating said hooks about said fixed axes.

2. An ejecting mechanism for releasing an externally carried object attached to an aircraft comprising a back-up fitting on the aircraft having a pair of inwardly facing flanges, an ejection housing to which said object is affixed, said housing being receivable within said fitting intermediate its flanges and having a pair of hooks pivotally mounted thereon for engagement with said flanges, the axes of pivot of said hooks being disposed inwardly of the hook flange engaging portions, resilient means urging said hooks outwardly into engagement with said flanges, lock means normally contacting said hooks for retaining said hooks in engagement with said flanges and to prevent their disengagement, and means for rendering said lock means inoperative and to allow said hooks to be moved from engagement with said flanges, said means comprising a piston mounted for movement in a cylinder within said ejection housing, a firing chamber in the lower end of said cylinder, means generating rapidly expanding gases within said firing chamber for moving said piston upwardly, said piston having a ductile rim extending around the lower periphery thereof, said gases depressing said rim outwardly into engagement with the walls of said cylinder to provide a gas tight seal therebetween, said piston engaging said lock means on its firing stroke to carry said lock means out of engagement with said hooks and into abutment with said back-up fitting thereby to drive said housing away from said fitting to pivot said hooks inwardly out of engagement with said flanges by imparting thereto at their flange engaging portions inwardly directed uncoupling force moments.

3. An ejecting mechanism for releasing an externally carried object attached to an aircraft comprising a back-up fitting on the aircraft having a pair of spaced apart inwardly directed flanges, an ejection housing to which said object is affixed, said housing being receivable within said fitting intermediate its flanges and having a pair of outwardly directed hooks pivotally mounted at the top of said housing for engagement with surfaces of said flanges, said hooks pivoting about axes disposed inwardly of the hook flange engaging surfaces, resilient means urging said hooks outwardly for engagement with said flanges, said hooks having upper outwardly and downwardly inclined surfaces for camming said hooks inwardly by engagement against the lower surfaces of said flanges during upward movement of said housing relative to said back-up fitting, a vertically movable collar means for fitting between said hooks when said hooks are in engagement with said flanges to prevent inward movement of said hooks, means for vertically moving said collar independently of and from between said hooks to permit said hooks to be rotated inwardly about said axes and to be freed from engagement with said flanges, and adjustable aircraft surface contacting means spaced from said ejecting mechanism for stabilizing said mechanism against lateral forces thereagainst.

4. An ejecting mechanism for releasing an externally carried object attached to an aircraft comprising a back-up fitting on the aircraft having a pair of inwardly directed flanges, an ejection housing to which said object is affixed, said housing being capable of being received within said fitting intermediate its flanges and having a pair of outwardly directed hooks mounted thereon for rotation into and out of engagement with surfaces of said flanges, said hooks pivoting about axes disposed inwardly of the hook flange engaging surfaces, resilient means urging said hooks outwardly for engagement with said flanges, a vertically movable locking means for fitting between said hooks when said hooks are in engagement with said flanges to prevent their inward movement, means for vertically moving said locking means from between said hooks to permit inward movement of said hooks about said axes and free same from engagement with said flanges, said vertically moving means comprising a piston mounted for vertical movement in a cylinder within said ejection housing, a firing chamber in the lower end of said cylinder, means generating rapidly expanding gases within said firing chamber for moving said piston upwardly, said piston having a ductile rim extending around the lower periphery thereof, said gases depressing said rim outwardly into engagement with the walls of said cylinder to provide a gas tight seal therebetween, an aperture in said cylinder near the top thereof to release gases upon communication therewith by upward passage of said piston, said piston engaging said locking means on its upward stroke to carry said locking means upwardly into engagement with said back-up fitting thereby to drive said housing downwardly away from said fitting to rotate said hooks inwardly out of engagement with said flanges by imparting thereto at their flange engaging surfaces inwardly directed uncoupling force moments.

5. An ejecting mechanism for releasing an inwardly carried object attached to an aircraft comprising a back-up fitting on the aircraft having a pair of spaced apart inwardly directed flanges, an ejection housing to which said object is affixed, said housing being capable of being received within said fitting intermediate its flanges and having a pair of outwardly directed hooks pivotally mounted at the top of said housing for engagement with surfaces of said flanges, said hooks pivoting about axes disposed inwardly of the hook flange engaging surfaces, resilient means urging said hooks outwardly for engagement with said flanges, said hooks having upper outwardly and downwardly inclined surfaces for camming said hooks inwardly by engagement against the lower surface of said flanges during upward movement of said housing relative to said back-up fitting, a vertically movable collar means for fitting between said hooks when said hooks are in engagement with said flanges to prevent inward movement of said hooks, resilient means releasably retaining said collar between said hooks, means for vertically moving said collar from between said hooks to effect inward movement of said hooks about said axes to free said hooks from engagement with said flanges, said means comprising a piston mounted for vertical movement in a cylinder within said ejection housing, a firing chamber in the lower end of said cylinder, means generating rapidly expanding gases within said firing chamber for moving said piston upwardly, said piston having a ductile rim extending around the lower periphery thereof, said gases depressing said rim outwardly into engagement with the walls of said cylinder to provide a gas tight seal therebetween, an aperture in said cylinder near the top thereof to release gases upon communication therewith by upward movement of said piston, said piston engaging said collar on its upward stroke to carry said collar upwardly from its position between said hooks into a position of abutment with said back-up fitting, said housing thereupon being driven away from said back-up fitting to effect inward pivoting of said hooks out of engagement with said flanges by imparting to said hooks at their flange engaging surfaces inwardly directed uncoupling force moments, and adjustable aircraft surface contacting means spaced from said ejecting mechanism for stabilizing said mechanism against lateral forces thereagainst.

6. An ejecting mechanism for releasing an externally carried object attached to an aircraft comprising a back-up fitting on the aircraft having a pair of spaced apart inwardly directed flanges, an ejection housing to which said object is affixed, said housing being capable of being received within said fitting intermediate its flanges and having a pair of outwardly directed hooks pivotally mounted at the top of said housing for engagement with surfaces of said flanges, said hooks pivoting about axes disposed inwardly of the hook flange engaging surfaces, resilient means urging said hooks outwardly for engagement with said flanges, said hooks having upper outwardly and downwardly inclined surfaces for camming said hooks inwardly by engagement against the lower surfaces of said flanges during upward movement of said housing relative to said back-up fitting, a vertically movable collar means for fitting between said hooks when said hooks are in engagement with said flanges to prevent inward movement of said hooks, means for vertically moving said collar from between said hooks to effect inward movement of said hooks about said axes to free said hooks from engagement with said flanges, said means comprising a piston mounted for vertical movement in a cylinder within said ejection housing, a firing chamber in the lower end of said cylinder, means generating rapidly expanding gases within said firing chamber for moving said piston upwardly, said piston having a ductile rim extending about the lower periphery thereof, said gases depressing said rim outwardly into engagement with the walls of said cylinder to provide a gas tight seal therebetween, an aperture in said cylinder near the top thereof to release gases upon communication therewith by upward movement of said piston, said piston engaging said collar on its upward stroke to carry said collar upwardly from its position between said hooks into a position of abutment with said back-up fitting, said housing thereupon being driven away from said back-up fitting to effect inward pivoting of said hooks out of engagement with said flanges by imparting to said hooks at their flange engaging surfaces inwardly directed uncoupling force moments, a rubber bumper mounted on said piston for engaging said back-up fitting, upward movement of said piston compressing said bumper, and adjustable aircraft surface contacting means spaced from said ejecting mechanism for stabilizing said mechanism against lateral forces thereagainst.

7. An ejecting mechanism for releasing an externally carried object attached to an aircraft comprising a back-up fitting on the aircraft having a pair of spaced apart inwardly directed flanges, an ejection housing to which said object is affixed, said housing being receivable within said fitting intermediate its flanges and having a pair of outwardly directed hooks pivotally mounted at the top of said housing for engagement with surfaces of said flanges, said hooks pivoting about axes disposed inwardly of the hook flange engaging surfaces, resilient means urging said hooks outwardly for engagement with said flanges, said hooks having upper outwardly and downwardly inclined surfaces for camming said hooks inwardly by engagement against the lower surfaces of said flanges during upward movement of said housing relative to said back-up fitting, a vertically movable collar means for fitting between said hooks when said hooks are in engagement with said flanges to prevent inward movement of said hooks, means for vertically moving said collar from between said hooks to effect inward movement of said hooks about said axes to free said hooks from engagement with said flanges, said means comprising a piston mounted for vertical movement in a cylinder within said ejection housing, a firing chamber in the lower end of said cylinder, means generating rapidly expanding gases within said firing chamber for moving said piston upwardly, said piston having a ductile rim extending around the lower periphery thereof, said gases depressing said rim outwardly into engagement with the walls of said cylinder to provide a gas tight seal therebetween, a second gas generating means vertically spaced from said first generating means, said second generating means becoming activated upon upward passage of said piston and exposure thereto with gases generated by said first gas generating means, an aperture in said cylinder near the top thereof to release gases upon communication therewith by upward movement of said piston, said piston engaging said collar on its upward stroke to carry said collar upwardly from its position between said hooks into a position of abutment with said back-up fitting, said housing thereupon being driven away from said back-up fitting to effect inward pivoting of said hooks out of engagement with said flanges by imparting to said hooks at their flange engaging surfaces inwardly directed uncoupling force moments, a rubber bumper mounted on said piston for engaging said back-up fitting, upward movement of said piston compressing said bumper, and adjustable aircraft surface contacting means spaced from said ejecting mechanism for stabilizing said mechanism against lateral forces thereagainst.

References Cited in the file of this patent

UNITED STATES PATENTS

| | | | |
|---|---|---|---|
| 2,360,217 | Francis | Oct. 10, | 1944 |
| 2,434,755 | Boyd | Jan. 20, | 1948 |
| 2,466,980 | Bronson | Apr. 12, | 1949 |
| 2,625,423 | Hight | Jan. 13, | 1953 |
| 2,823,379 | Novak | Feb. 11, | 1958 |
| 2,852,981 | Caya | Sept. 23, | 1958 |
| 2,942,911 | Stott | June 28, | 1960 |

FOREIGN PATENTS

| | | | |
|---|---|---|---|
| 979,155 | France | Dec. 6, | 1950 |
| 609,456 | Great Britain | Sept. 30, | 1948 |